United States Patent
Ryals et al.

(10) Patent No.: US 7,450,615 B2
(45) Date of Patent: Nov. 11, 2008

(54) APPARATUS AND METHOD FOR AUTOMATICALLY BYPASSING A LOAD COIL IN A DIGITAL SUBSCRIBER LINE CIRCUIT

(75) Inventors: Steven Ryals, Pinson, AL (US); Donald Smith, Vinemont, AL (US)

(73) Assignee: AT&T Intellectual Properties I, L.P., Reno, NV (US)

( * ) Notice: Subject to any disclaimer, the term of this patent is extended or adjusted under 35 U.S.C. 154(b) by 742 days.

(21) Appl. No.: 10/897,858

(22) Filed: Jul. 23, 2004

(65) Prior Publication Data

US 2006/0018337 A1    Jan. 26, 2006

(51) Int. Cl.
*H04J 1/02* (2006.01)
(52) U.S. Cl. ...................................... 370/497
(58) Field of Classification Search ................. 370/494, 370/497, 480, 488, 490
See application file for complete search history.

(56) References Cited

U.S. PATENT DOCUMENTS 6,909,883 B2 *   6/2005   Fujiwara ...................... 455/84
6,947,529 B2 *   9/2005   Norrell et al. ............ 379/93.01

* cited by examiner

*Primary Examiner*—Kwang B. Yao
*Assistant Examiner*—Tung Q Tran
(74) *Attorney, Agent, or Firm*—Hanley, Flight & Zimmerman, LLC

(57) ABSTRACT

An apparatus and method are provided for bypassing a load coil in a Digital Subscriber Line (DSL) circuit. An interface is provided for making a connection with the DSL circuit and receiving a combined multichannel signal. The combined multichannel signal includes a high frequency or DSL signal and a low frequency signal or voice signal. A high pass filter is utilized to block the voice signal and route the DSL signal over a communications path to bypass the load coil in the DSL circuit. The voice signal is then routed by a low pass filter to the load coil in the DSL circuit.

16 Claims, 3 Drawing Sheets

APPARATUS AND METHOD FOR AUTOMATICALLY BYPASSING A LOAD COIL IN A DIGITAL SUBSCRIBER LINE CIRCUIT

TECHNICAL FIELD

The present invention generally relates to the field of broadband data communications and, more specifically, relates to the field of digital subscriber line communications.

BACKGROUND OF THE INVENTION

The advent and explosion of the World Wide Web and the Internet have created a huge demand for data communications bandwidth. Once satisfied with a 56 Kb/s analog modem, many home users are now demanding broadband Internet connections capable of sustaining 1.5 Mb/s, or more. In order to satisfy this ever-increasing demand for bandwidth to the home and office, several competing standards for data communications have emerged. One of these standards is digital subscriber line ("DSL") technology.

DSL is a high-speed connection that utilizes the same wires as a regular telephone line. DSL offers a number of advantages over other types of high-speed links to the home and office. For instance, because DSL utilizes a higher frequency for data communications than that used for voice communications, the same phone line may be used for both data and voice simultaneously. Moreover, several different types of DSL connections exist that can provide extremely high data rates without requiring new wiring. Therefore, DSL can operate on the existing phone line already present in most homes and businesses.

A typical DSL circuit comprises a standard telephone line connection at a customer premises which is wired to a DSL access multiplexer ("DSLAM") located at a central office ("CO") or a remote terminal ("RT") serving the customer. The DSLAM is capable of communicating data over the customer telephone line. The standard telephone line connection at the customer premises is also wired to a voice switch connected to the Public Switched Telephone Network ("PSTN") in the CO. The voice switch is capable of communicating voice over the customer telephone line. The wiring carrying the data signals from the DSLAM are tied into the wiring carrying the voice signals from the voice switch enabling the combined voice and data signals to travel over the same telephone line to the customer premises.

The wiring of DSL circuits suffer from a number of drawbacks, however, when there are pre-existing plain old telephone service ("POTS") circuits between the CO and a customer premises. In conventional POTS circuits, standard voice phone calls degrade noticeably when the copper portion of a phone line is greater than 18,000 feet long. In order to restore call quality, load coils are inserted at specific intervals along a telephone line to boost the strength of the voice frequency range at the expense of higher frequencies. Typically, the coils are placed at 3000 foot intervals from either end, and at 6000 foot intervals along the phone line. However, in boosting the voice frequency range, load coils also act to block the higher frequencies utilized in the communication of DSL data signals. Thus, one drawback is that load coils must be located and removed in order to provision DSL circuits on the phone line. Another drawback is that when DSL circuits are removed, the load coils must be spliced back into the phone line to provide acceptable voice quality for customers greater than 18,000 feet from the CO. Yet another drawback is that the process of continually adding and removing load coils reduces the integrity in the phone line resulting in degraded voice and data communication. It is with respect to these considerations and others that the various illustrative embodiments of the present invention have been made.

SUMMARY OF THE INVENTION

Illustrative embodiments of the present invention solves the above-described problems by providing an apparatus for automatically bypassing a load coil in a DSL circuit. According to one aspect of the invention, a first interface for providing a connection with the DSL circuit receives a multichannel signal. The multichannel signal includes a high frequency channel and a low frequency channel. The high frequency channel includes a high frequency or DSL signal. The low frequency channel includes a low frequency signal or voice signal. The apparatus also includes a first filter to block the voice signal and route the DSL signal over a first communications path to bypass the load coil in the circuit. The first filter may be a high pass filter such as a capacitor.

The apparatus further includes a second interface connected to the load coil in the DSL circuit and a second filter. The second filter receives the voice signal from the multichannel signal and routes it over a second communications path to the load coil over the second interface. The second filter may be a low pass filter such as an inductor.

Another aspect of the present invention may be implemented as a method for automatically bypassing a load coil in a DSL circuit. The method includes receiving a multichannel signal comprising a high frequency signal and a low frequency signal, blocking the low frequency signal, and routing the high frequency signal over a communications path to bypass the load coil in the DSL circuit.

These and various other features, as well as advantages, which characterize the present invention, will be apparent from a reading of the following detailed description and a review of the associated drawings

flow diagram illustrating an exemplary method for wiring a DSL circuit between a customer premises, a DSLAM, and a voice switch.

DETAILED DESCRIPTION OF AN ILLUSTRATIVE EMBODIMENT

In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
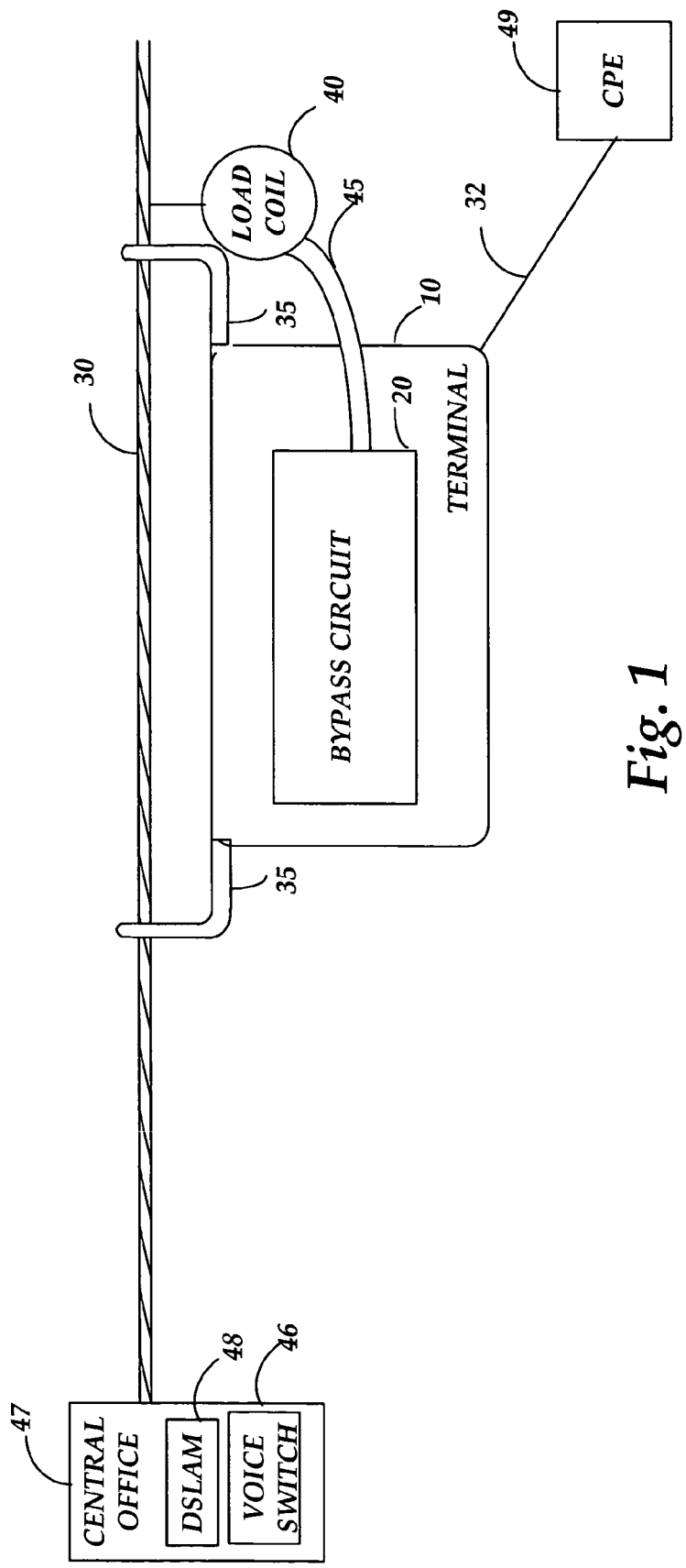
FIG. 1 is a block diagram showing illustrating aspects of a systems architecture for bypassing a load coil in a DSL circuit according to an illustrative embodiment of the invention.

Referring now to FIG. 1, a systems architecture for bypassing a load coil in a DSL circuit will be described according to an illustrative embodiment of the invention. As shown in FIG. 1, a Central Office ("CO") 47 is connected to a terminal 10 through a telephone cable 30. The terminal 10 connects the CO 47 to customer premises equipment ("CPE") 49 via a "drop" cable 32 which is a standard plain old telephone service ("POTS") telephone line. The CO 47 includes a DSLAM 48 which, in one illustrative embodiment, may be configured to communicate DSL signals to the CPE 49 over the drop cable 32. The CO 47 also includes a voice switch 46 which may be configured to communicate POTS (i.e., voice) signals to the CPE 49 over the drop cable 32. As is known to those skilled in the art, the wiring carrying the DSL signals from the DSLAM 48 may be tied into the wiring carrying the POTS signals from the voice switch so that the two signals ride together on the telephone line connecting the CO 47 to the CPE 49. The connection between the CO 47 and the CPE 49 is known as a "DSL circuit."

In the presently described illustrative embodiment of the invention, the voice and data signals may conform to the Asymmetric DSL ("ADSL") standard in which a low frequency POTS voice signal (including dial tone) is combined with a high frequency DSL data signal and simultaneously communicated in the DSL circuit. In an alternative illustrative embodiment, the CO 47 may be configured to only send a DSL data signal to the CPE 49 (i.e., without a POTS voice signal) in conformance with the Symmetric ("SDSL") in a manner known to those skilled in the art. Those skilled in the art will appreciate that illustrative embodiments of the invention may be utilized with other current and emerging DSL standards including, but not limited to, High Speed DSL ("HDSL" or "G.SHDSL") and Very High Speed DSL ("VDSL").

The CPE 49 may include one or more devices capable of receiving DSL and POTS signals including, but not limited to, DSL modems, routers and gateways as well as conventional POTS telephones used for making and receiving telephone calls. The terminal 20 is connected to the telephone cable 30 via splice cables 35 in a manner known to those skilled in the art. It will be appreciated that the terminal 10 may be hung from the telephone cable 30 in an aerial configuration, or alternatively, buried with the telephone cable 30 underground.

The terminal 10 is also connected to a load coil 40, spliced to the telephone cable 30, via cable 45. As is known to those skilled in the art, load coils are typically spliced into telephone lines at various intervals to provide "line conditioning" (i.e., to prevent the degradation of POTS voice band signals between about 300 Hz and 3400 Hz) for POTS circuits exceeding distances of about 18,000 feet. In a typical configuration, load coils are placed 3,000 feet from each end of a POTS circuit and at intervals of 6,000 feet along the circuit. In a typical POTS circuit, load coils behave as low pass filters higher frequency signals, such as DSL signals, from passing through.

The terminal 10 also includes a bypass circuit 20 for enabling DSL signals to bypass the load coil 40 in the DSL circuit between the CO 47 and the CPE 49. The bypass circuit 20 will be discussed in greater detail in the description of FIGS. 2-3, below.

Figure 2:
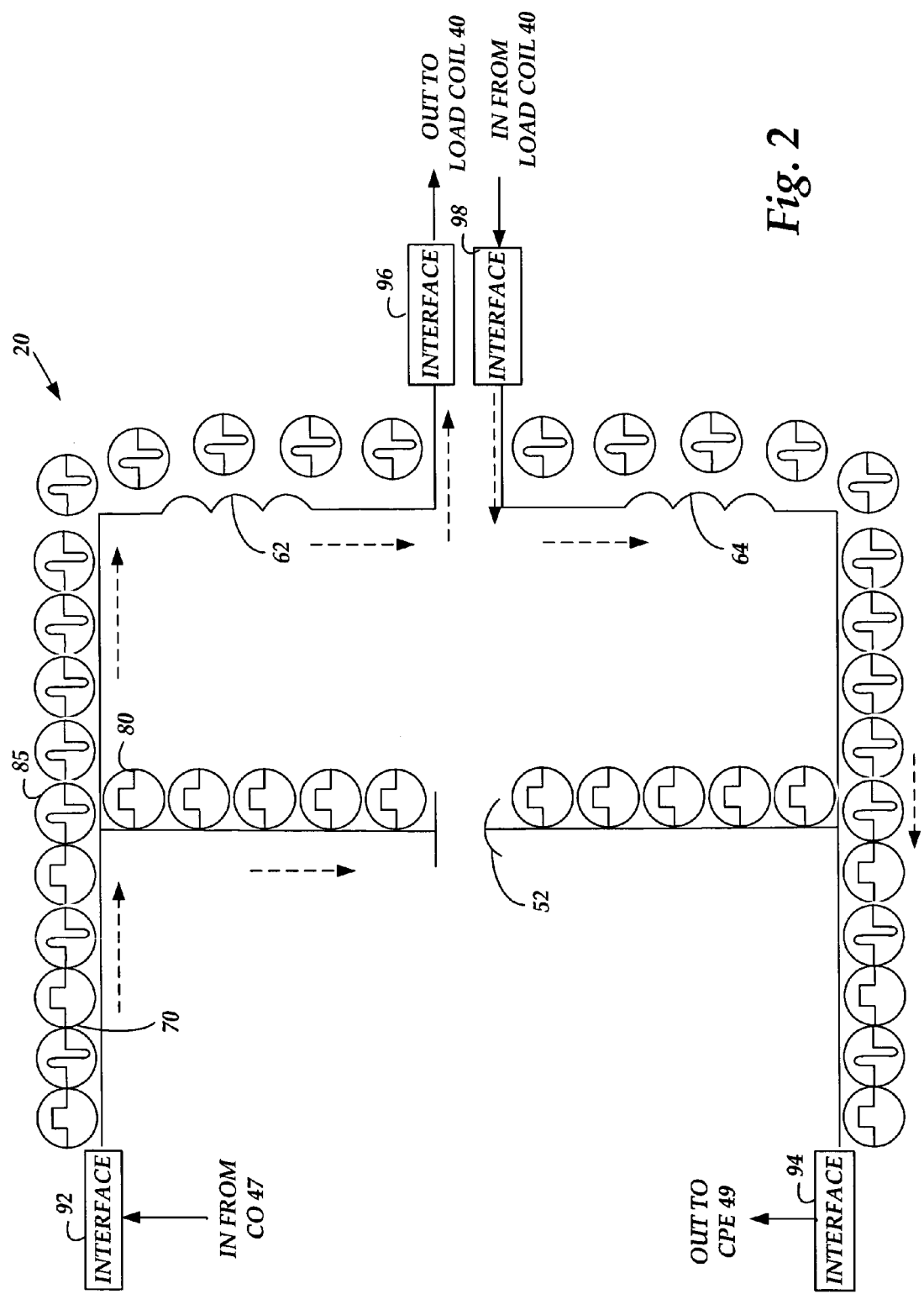
FIG. 2 is a circuit diagram illustrating aspects of the bypass circuit of FIG. 1 for bypassing a load coil in a DSL circuit according to an illustrative embodiment of the invention.

Referring now to FIG. 2, the bypass circuit 20 briefly discussed above in the description of FIG. 1, will now be described in greater detail. As shown in FIG. 2, the bypass circuit 20 includes interfaces 92, 94, 96, and 98 as well as a capacitor 52 and inductors 62 and 64. The interfaces 92 and 94 are configured to receive a multichannel signal 70 sent from the CO 47 to the terminal 10 and transmit the multichannel signals 70 from the terminal 10 to the CPE 49. The multichannel signal 70 comprises a high frequency channel consisting of a DSL signal and a low frequency channel consisting of a POTS voice signal. The interfaces 96 and 98 are configured to transmit the POTS voice signal 85 from the multichannel signal 70 out of the bypass circuit 20 to the load coil 40 for line conditioning and receive the conditioned POTS voice signal 85 from the load coil 40 back into the bypass circuit 20. It will be appreciated that the bypass circuit 20 may comprise a circuit board mounted to the internal housing of the terminal 10 via screws or other connecting means known to those skilled in the art. The interfaces 92, 94, 96, and 98 may comprise a splice module consisting of a splice cable attached to a wiring harness in a manner known to those skilled in the art.

The capacitor 52 functions as a high pass filter while the inductors 62 and 64 function as low pass filters in the bypass circuit 20. As is known to those skilled in the art, capacitors appear as shorts to high frequencies and opens to low frequencies while inductors appear as shorts to low frequencies and opens to high frequencies. Specifically, in the bypass circuit 20 of FIG. 2, high frequency or DSL signal 80 is routed across the capacitor 52 while the low frequency or POTS signal 85 is blocked. Furthermore, the low frequency or POTS signal 85 is routed across the inductors 62 and 64 and into and out of the load coil 40 while high frequency or DSL signal 80 is blocked. The dashed arrows in FIG. 2 show the signal flow of the multichannel signal 70 through the bypass circuit 20.

Figure 3:
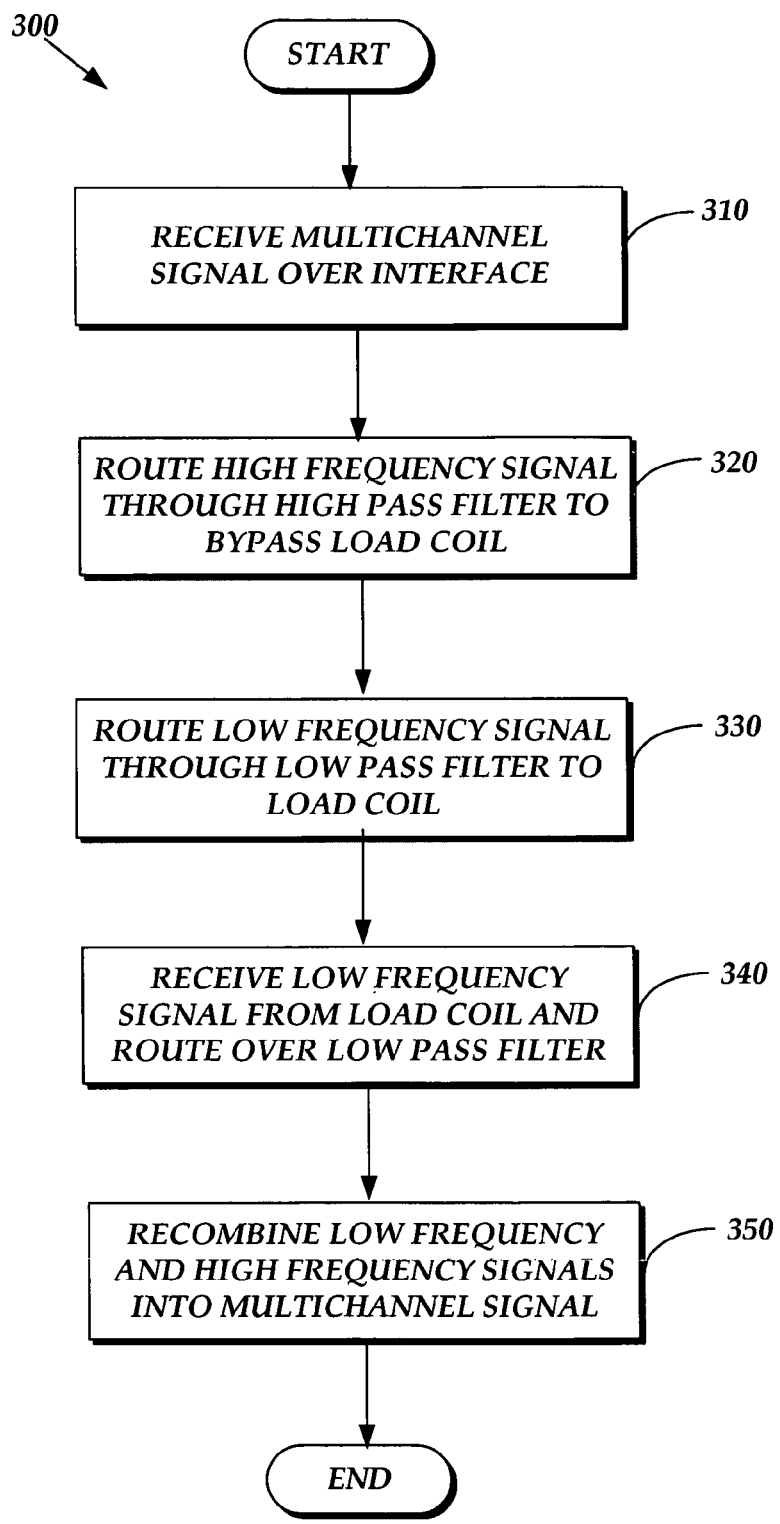
FIG. 3 is a flow diagram illustrating aspects of a process for bypassing a load coil in the systems architecture of FIG. 1, according to an illustrative embodiment of the invention.

Referring now to FIG. 3, a routine 300 illustrating an illustrative process for utilizing the bypass circuit 20 to bypass the load coil 40 in the DSL circuit discussed above with respect to FIGS. 1 and 2, will now be described. The routine 300 begins at operation 310, wherein the multichannel signal 70 is received into the bypass circuit 20 over the interface 92.

From operation 310, the routine 300 continues to operation 320 where the high frequency or DSL signal 80 is routed through a high pass filter (i.e., the capacitor 52) to bypass the load coil 40. In particular, as the multichannel signal 70 crosses the terminals of the capacitor 52, the DSL signal is routed over the capacitor 52 while the low frequency or POTS voice signal 85 is blocked by the capacitor 52. The routine 300 then continues from operation 320 to operation 330.

At operation 330, the low frequency signal 85 is routed through a low pass filter (i.e., the inductor 62) to the load coil 40. In particular, the low frequency signal 85 from the multichannel signal 70 crosses the terminals of the capacitor 52 and continues over the inductor 62 where the signal is routed to the load coil 40 through the interface 96 for line conditioning. The routine 300 then continues from operation 330 to operation 340.

At operation 340, the bypass circuit 20 receives the low frequency signal 85 from load coil 40 and routes the low frequency signal 85 over a low pass filter (i.e., the inductor 64). In particular, the low frequency signal 85 returns from the load coil 40 through the interface 98 to the bypass circuit 20 where the low frequency signal 85 continues to flow over the inductor 64. The routine 300 then continues from operation 340 to operation 350.

At operation 350, the low frequency and high frequency signals 85 and 80 are recombined into the multichannel signal 70. In particular, the low frequency signal 85 routed over the inductor 64 is combined with the high frequency signal 80 routed over the capacitor 52 into a combined multichannel signal which is then transmitted to the CPE 49 over the interface 94. The routine 300 then ends.

While illustrative embodiments of the present invention have been shown and described, it will be apparent to those of ordinary skill in the art that a number of changes, modifications, or alterations to the invention as described may be made, none of which depart from the spirit of the present invention. For example, while the filters in the bypass circuit are described as being implemented as analog components (i.e., capacitors and inductors), it will be clear to one of ordinary skill in the art that the filters may also be implemented as digital components or a combination of analog and digital components. These and other such changes, modifications, and alterations should therefore be seen as within the scope of the present invention.

Based on the foregoing, it should be appreciated that the various illustrative embodiments of the invention include an apparatus and method for bypassing a load coil in a DSL circuit. The above specification provides a complete description of the manufacture and use of the composition of the invention. Since many illustrative embodiments of the invention can be made without departing from the spirit and scope of the invention, the invention resides in the claims hereinafter appended.

We claim:

1. A system for routing a combined multi-frequency signal in a communications network, the system comprising:
   a load coil operative to provide line conditioning, wherein the load coil only receives low frequency signals;
   a terminal configured to receive the combined multi-frequency signal in the communications network, the terminal comprising a bypass circuit mounted to the terminal housing, wherein the bypass circuit is configured to route a low frequency signal to the load coil and route a high frequency signal to bypass the load coil, the bypass circuit comprising:
      a first interface for providing a connection with a digital subscriber line circuit in the communications network receiving the combined multi-frequency signal, the combined multi-frequency signal comprising the high frequency signal and the low frequency signal;
      a first filter in communication with the first interface, wherein the first filter is operative to:
         block the low frequency signal, and
         route the high frequency signal over a first communications path to bypass the load coil in the digital subscriber line circuit;
      a second interface for providing a connection with the load coil in the digital subscriber line circuit receiving the combined multi-frequency signal;
      a second filter in communication with the second interface, wherein the second filter is operative to:
         block the high frequency signal, and
         route the low frequency signal over a second communications path to the load coil over the second interface; and
      a third interface for receiving a recombined multi-frequency signal, the recombined multi-frequency signal comprising the high frequency signal from the first communications path and the low frequency signal from the second communications path.

2. The apparatus of claim 1, wherein the first filter is a high pass filter and the second filter is a low pass filter.

3. The apparatus of claim 2, wherein the high pass filter comprises at least one capacitor for routing the high frequency signal over the first communications path.

4. The apparatus of claim 2, wherein the low pass filter comprises at least one inductor for routing the low frequency signal over the second communications path.

5. The apparatus of claim 1, wherein the high frequency signal comprises a digital signal and the low frequency signal comprises an analog voice signal.

6. The apparatus of claim 1, wherein the high frequency signal is communicated at a frequency greater than 3400 Hz in the communications network.

7. The apparatus of claim 1, wherein the low frequency signal is communicated at a frequency less than 3400 Hz in the communications network.

8. A method of automatically bypassing a load coil in a digital subscriber line circuit in a communications network, the method comprising:
   receiving a combined multi-frequency signal at a terminal, the terminal comprising a bypass circuit mounted to the terminal housing, the bypass circuit routing a low frequency signal to the load coil and bypassing a high frequency signal around the load coil, wherein routing, by the bypass circuit, the low frequency signal to the load coil and bypassing, by the bypass circuit, the high frequency signal around the load coil comprises:
      receiving the combined multi-frequency signal at a first interface, the combined multi-frequency signal comprising the high frequency signal and the low frequency signal;
      blocking the low frequency signal of the multi-frequency signal at the first interface;
      routing the high frequency signal of the multi-frequency signal from the first interface over a first communications path to bypass the load coil in the digital subscriber line circuit;
      receiving the combined multi-frequency signal at a second interface;
      blocking the high frequency signal of the multi-frequency signal at the second interface;
      routing the low frequency signal of the multi-frequency signal at the second interface over a second communications path to the load coil in the digital subscriber line circuit; and
      recombining the low frequency signal and the high frequency signal into a recombined multi-frequency signal at a third interface.

9. The method of claim 8, wherein routing the high frequency signal over the first communications path to bypass the load coil in the digital subscriber line circuit comprises routing the high frequency signal through a high pass filter.

10. The method of claim 8, wherein routing the low frequency signal over the second communications path through the load coil in the digital subscriber line circuit comprises routing the low frequency signal through a low pass filter.

11. The method of claim 9, wherein the high pass filter comprises at least one capacitor for routing the high frequency signal over the first communications path.

12. The method of claim 10, wherein the low pass filter comprises at least one inductor for routing the low frequency signal over the second communications path.

13. The method of claim 8, wherein the high frequency signal comprises a digital signal and the low frequency signal comprises an analog voice signal.

14. The method of claim 8, wherein the high frequency signal is communicated at a frequency greater than 3400 Hz in the communications network.

15. The method of claim 8, wherein the low frequency signal is communicated at a frequency less than 3400 Hz in the communications network.

16. An apparatus for automatically bypassing high frequency signals around a load coil in a digital subscriber line circuit in a communications network, the load coil being operative to provide line conditioning for low frequency signals, the apparatus comprising:
- a terminal configured to receive a combined multi-frequency signal in the communications network, the terminal comprising a bypass circuit mounted to the terminal housing, wherein the bypass circuit is configured to route a low frequency signal to the load coil and route a high frequency signal to bypass the load coil, the bypass circuit comprising:
  - a first interface for providing a connection with the digital subscriber line circuit in the communications network;
  - a high pass filter in communication with the first interface, the high pass filter comprising at least one capacitor, wherein the high pass filter is operative to:
    - receive a digital subscriber line signal; and
    - route the digital subscriber line signal over a first communications path to bypass the load coil in the digital subscriber line circuit;
  - a second interface for providing a connection with the load coil in the digital subscriber line circuit;
  - a low pass filter in communication with the second interface, the low pass filter comprising at least one inductor, wherein the low pass filter is operative to:
    - receive an analog voice signal; and
      - route the analog voice signal over a second communications path to the load coil in the digital subscriber line circuit; and
  - a third interface for receiving a recombined multi-frequency signal, the recombined multi-frequency signal comprising the high frequency signal from the first communications path and the low frequency signal from the second communications path.

* * * * *